(12) United States Patent
Sakaniwa et al.

(10) Patent No.: US 9,890,080 B2
(45) Date of Patent: Feb. 13, 2018

(54) CEMENT PLANT

(75) Inventors: Daisuke Sakaniwa, Ibaraki (JP); Junzhu Wang, Ibaraki (JP); Hirokazu Shima, Ibaraki (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 639 days.

(21) Appl. No.: 14/127,332

(22) PCT Filed: Jan. 19, 2012

(86) PCT No.: PCT/JP2012/000303
§ 371 (c)(1),
(2), (4) Date: Dec. 18, 2013

(87) PCT Pub. No.: WO2013/014816
PCT Pub. Date: Jan. 31, 2013

(65) Prior Publication Data
US 2014/0120486 A1    May 1, 2014

(30) Foreign Application Priority Data
Jul. 25, 2011 (JP) .................................. 2011-161685

(51) Int. Cl.
*C04B 7/60* (2006.01)
*F27B 7/20* (2006.01)
(Continued)

(52) U.S. Cl.
CPC ............... *C04B 7/60* (2013.01); *C04B 7/432* (2013.01); *F27B 7/20* (2013.01); *F27D 17/008* (2013.01)

(58) Field of Classification Search
CPC ................................. C04B 7/60; C04B 7/432
(Continued)

(56) References Cited

U.S. PATENT DOCUMENTS 4,035,193 A * 7/1977 Miyamoto ................ F27B 7/20
106/759
4,249,892 A * 2/1981 Brachthauser .......... C04B 7/434
106/759
(Continued)

FOREIGN PATENT DOCUMENTS

JP     9 309751     12/1997
JP     3503402      3/2004
(Continued)

OTHER PUBLICATIONS

International Search Report dated Apr. 24, 2012 in PCT/JP12/000303 Filed Jan. 19, 2012.

*Primary Examiner* — Nathaniel Herzfeld
(74) *Attorney, Agent, or Firm* — Oblon, McClelland, Maier & Neustadt, L.L.P.

(57) ABSTRACT

There is provided a cement plant including a chlorine bypass apparatus capable of efficiently reducing the chlorine concentration in a cement kiln due to exhaust gas extraction by a small amount, by preventing calciner exhaust gas low in chlorine concentration from contamination and extracting a part of kiln exhaust gas high in chlorine concentration. In the invention, a baffle wall 20 which protrudes, on a lower face 16a of an exhaust duct 16 of a calciner connected to the pipe inclination part 14 of an exhaust gas pipe 9 rising from a kiln inlet part 2 of a cement kiln 1, toward a pipe inclination part 14 side at an inclination angle α within a range of 20 to 60° relative to the horizontal plane, and a spacing between a lower end edge 20a of the baffle wall and an opposite wall plane 14a of the pipe inclination part is configured such that an average flow rate of the exhaust gas between the both falls within a range of 15 to 35 m/s.

3 Claims, 6 Drawing Sheets

(51) Int. Cl.
   *F27D 17/00*   (2006.01)
   *C04B 7/43*   (2006.01)
(58) Field of Classification Search
   USPC .............................. 432/105, 106, 55, 56, 72
   See application file for complete search history.

(56) References Cited

U.S. PATENT DOCUMENTS

| | | | | |
|---|---|---|---|---|
| 4,323,397 A | * | 4/1982 | Herchenbach | F27B 7/2033 106/754 |
| 4,425,092 A | * | 1/1984 | Brachthauser | F27B 7/2033 34/93 |
| 4,747,879 A | * | 5/1988 | Wolter | F27B 7/2033 106/756 |
| 4,875,919 A | * | 10/1989 | DeSaro | C03B 3/023 65/134.6 |
| 5,122,190 A | * | 6/1992 | von Seebach | C04B 2/10 106/758 |
| 5,364,265 A | * | 11/1994 | Paliard | F27B 7/2033 432/106 |
| 5,992,041 A | * | 11/1999 | McClaine | B01J 8/006 34/178 |
| 6,050,203 A | * | 4/2000 | Reese | C04B 7/4407 110/226 |
| 6,484,416 B1 | * | 11/2002 | Rawe | C04B 7/40 34/209 |
| 2005/0274067 A1 | * | 12/2005 | Morton | C04B 7/4407 44/606 |
| 2007/0184396 A1 | * | 8/2007 | Lowes | F27D 7/04 432/58 |
| 2008/0245275 A1 | * | 10/2008 | Mohr | C04B 7/436 106/739 |
| 2009/0193968 A1 | * | 8/2009 | Jepsen | B01D 53/06 95/134 |
| 2010/0083878 A1 | * | 4/2010 | Komatsu | B01D 45/12 106/751 |
| 2013/0224673 A1 | * | 8/2013 | Tiernan | F23G 5/444 432/105 |

FOREIGN PATENT DOCUMENTS

| | | |
|---|---|---|
| JP | 4093168 | 6/2008 |
| JP | 2008 224300 | 9/2008 |

* cited by examiner

CEMENT PLANT

TECHNICAL FIELD

The present invention relates to a cement plant including a chlorine bypass apparatus which extracts and removes a chlorine component in the system along with a part of exhaust gas.

BACKGROUND ART

FIG. 4 and FIG. 5 show a general and conventional cement plant. The cement plant includes a cement kiln 1 for burning cement raw material, a preheater 4 including a plurality of cyclones 4a to 4d provided toward a kiln inlet part 2 of the cement kiln 1, a chute 5 which feeds the cement raw material to the kiln inlet part 2 of the cement kiln 1 from the cyclone 4d of the preheater 4 in its lowermost stage, an exhaust line 7 connected to the cyclone 4a in the uppermost stage and having an exhaust fan 6 which discharges combustion exhaust gas, and a main burner 8 provided at a kiln outlet part 3 for heating the inside of the cement kiln 1, and further includes a calciner 10, between the cyclone 4c in the third stage and the cyclone 4d in the fourth stage, to the lower end part of which exhaust gas at high temperature is introduced from the kiln inlet part 2 of the cement kiln 1 through an exhaust gas pipe 9 and inside of which a combustion apparatus of fine powder carbon is provided.

Furthermore, in the above-mentioned plant of cement clinker, the above-mentioned cement raw material fed to the cyclone 4a in the uppermost stage is preheated by the exhaust gas at high temperature from the cement kiln 1 which gas elevates from the downside as the cement raw material falls downward sequentially in the cyclone 4; after that, is pulled out from the cyclone 4c to be sent to the calciner 10 and is calcined in the calciner 10; after that, is introduced to the kiln inlet part 2 of the cement kiln 1 from the cyclone 4d in the lowermost stage through the chute 5; and is sent from the kiln inlet part 2 side to the kiln outlet part 3 in the cement kiln 1 which is driven to rotate around its axis line, being burnt to afford cement clinker in this process.

Meanwhile, combustion exhaust gas discharged from the cement kiln 1 is configured to be mixed with exhaust gas from the calciner 10 in the exhaust gas pipe 9; after that to be sent to the cyclone 4d in the lowermost stage and to be sent to the upside sequentially in the cyclone 4; and to preheat the above-mentioned cement raw material and to be finally discharged by the exhaust fan 6 from the upper part of the cyclone 4a in the uppermost stage through the exhaust line 7.

In such a cement plant, a chlorine component contained in the cement raw material and/or a chlorine component contained in waste such as plastics which is thrown in as a part of fuel are evaporated mainly as alkaline chloride such as KCl and NaCl under an atmosphere at a high temperature (approximately 1400° C.) in the cement kiln 1 to transfer into the exhaust gas. Then, when being discharged from the kiln inlet part 2 of the cement kiln 1 to the preheater 4 side and elevating sequentially in the cyclones 4d to 4a from the downside to the upside, the exhaust gas is cooled by preheating the cement raw material, and the chlorine component contained in the relevant exhaust gas results in its transfer again to the cement raw material side.

As a result, since the chlorine component cycles in the system constituted of the above-mentioned cement kiln 1 and preheater 4, due to a chlorine component or the like newly brought in the system from the above-mentioned fuel or cement raw material, the chlorine concentration inside elevates gradually, and eventually, causes occlusion of the cyclones of the preheater 4 and deficiently affects the operation.

Therefore, in a cement plant as mentioned above, a chlorine bypass apparatus for removing a chlorine component in the system is provided in recent years. The chlorine bypass apparatus is schematically configured of a gas extracting pipe 11 which is connected to the exhaust gas pipe 9 from the kiln inlet part 2 and picks out and cools a part of the exhaust gas, a cyclone 12 which separates and removes cement raw material that is large in particle diameter from the exhaust gas picked out by the gas extracting pipe 11, and a bag filter 13 which catches the chlorine component contained in the exhaust gas having passed through the cyclone 12.

According to the above-mentioned chlorine bypass apparatus, a part of exhaust gas discharged from the cement kiln 1 through the exhaust gas pipe 9 is periodically picked out and cooled by means of the gas extracting pipe 11 to thereby recover the chlorine component as alkaline chloride in the downstream bag filter 13, and thus the chlorine concentration in the system can be prevented from elevating.

As shown in FIG. 5, in a cement plant generally having the above-mentioned configuration, in order to feed, as a heat source to the upside preheater 4, the exhaust gas that is discharged from the kiln inlet part 2 of the cement kiln 1 whose axis line is substantially horizontal, the exhaust gas pipe 9 connected to the kiln inlet part 2 of the cement kiln 1 is formed of a pipe inclination part 14 gradually inclining upward toward the downstream side of a kiln exhaust gas (A) from the relevant kiln inlet part 2, and a rising duct (vertical part) 15 which is connected to the upper end part of the pipe inclination part 14 and introduces the exhaust gas (A) to the preheater 4.

Furthermore, an exhaust duct 16 of the calciner 10 is connected to the upside face of the pipe inclination part 14, and in addition, the gas extracting pipe 11 of the chlorine bypass apparatus is connected to the upside face of the pipe inclination part 14 between the exhaust duct 16 and the kiln inlet part 2. The exhaust duct 16 from the calciner 10 is commonly provided so as to be located as close to the kiln inlet part 2 side as possible such that heat exchange is efficiently performed between the exhaust gas (A) from the cement kiln 1 and dusts of the raw material along with calciner exhaust gas (B).

As a result, as indicated by a dot and dash line in the figure, there arises a phenomenon in which a part of the calciner exhaust gas (B) discharged from the exhaust duct 16 falls toward the kiln inlet part 2 side and is picked out along with a part of the kiln exhaust gas (A) from the gas extracting pipe 11 of the chlorine bypass apparatus (see analysis results shown in FIG. 6).

Here, although the chlorine bypass apparatus is designed on the assumption that the kiln exhaust gas (A) as high in concentration of the chloride gas as possible is extracted by a small amount, since the above-mentioned calciner exhaust gas (B) is low in concentration of the chloride gas compared with the kiln exhaust gas (A), the practical operation consequently results in picking-out of the exhaust gas whose concentration of the chloride gas is diluted with the calciner exhaust gas (B) from the gas extracting pipe 11.

As a result, there has been a problem that it is difficult to reduce the concentration of the chloride gas in the cement kiln 1 as specified in the design and specifications. When, on the other hand, in order to attain a predetermined reduction effect of the concentration of the chloride gas in the cement kiln 1 by increasing an amount of chlorine removal in the chlorine bypass apparatus, an amount of the exhaust gas extracted by the gas extracting pipe 11 is increased, there has been a problem that heat loss in the system becomes too much, causing manufacturing costs of the clinker to increase and productivity to deteriorate.

In addition, as a conventional cement plant including this kind of calciner and chlorine bypass apparatus, for example, ones which Patent Literatures 1 and 2 disclose as follows are known.

CITATION LIST

Patent Literature

Patent Literature 1: Japanese Patent No. 3503402
Patent Literature 2: Japanese Patent No. 4093168

SUMMARY OF INVENTION

Technical Problem

The present invention is devised in view of the above-mentioned circumstances and aims for providing a cement plant including a chlorine bypass apparatus capable of efficiently reducing the chlorine concentration in a cement kiln due to exhaust gas extraction by a small amount, by preventing calciner exhaust gas low in chlorine concentration from contamination and extracting a part of kiln exhaust gas high in the relevant chlorine concentration.

Solution to Problems

In order to solve the above-mentioned problem, the invention set forth in Claim 1 is characterized in a cement plant including: a calciner which calcines the cement raw material preheated by a preheater; a cement kiln which burns the cement raw material calcined by the calciner; an exhaust gas pipe which feeds exhaust gas discharged from a kiln inlet part of the cement kiln to the preheater; and a chlorine bypass apparatus which is connected to the exhaust gas pipe and picks out a part of the exhaust gas, wherein the exhaust gas pipe includes: a pipe inclination part which gradually inclines upward toward a downstream side of the exhaust gas from the kiln inlet part; and a rising duct which is connected to an upper end part of the pipe inclination part and introduces the exhaust gas to the preheater, wherein an exhaust duct of the calciner is connected to an upside face of the pipe inclination part, and a gas extracting pipe of the chlorine bypass apparatus is connected to the pipe inclination part between the exhaust duct and the kiln inlet part, wherein a baffle wall protruding toward the pipe inclination part side on a lower face of the exhaust duct of the calciner at an inclination angle within a range of 20 to 60° with respect to a horizontal plane is formed, and a spacing between a lower end edge of the baffle wall and an opposite wall plane of the pipe inclination part is configured such that an average flow rate of the exhaust gas between the lower end edge and an opposite plane falls within a range of 15 to 35 m/s.

Advantageous Effects of Invention

According to the cement plant of the present invention set forth in Claim 1, a baffle wall protruding toward the pipe inclination part side on a lower face of the exhaust duct of the calciner at an inclination angle within a range of 20 to 60° with respect to a horizontal plane is formed, and a spacing between a lower end edge of the baffle wall and an opposite wall plane of the pipe inclination part is configured such that an average flow rate of the exhaust gas between the both falls within a range of 15 to 35 m/s.

In the present invention, as apparent from the experimental results mentioned presently, the calciner exhaust gas from the exhaust duct can be prevented from falling down toward the kiln inlet part side of the cement kiln, and the kiln exhaust gas high in chlorine concentration can be exclusively sent from the gas extracting pipe to the chlorine bypass apparatus, this enabling the chlorine concentration in the cement kiln to be efficiently reduced due to exhaust gas extraction by a small amount.

Incidentally, the reason for the inclination angle of the above-mentioned baffle wall formed in the exhaust duct of the calciner with respect to the horizontal plane being 20 to 60° is that, when the relevant inclination angle exceeds 60°, a possibility where the calciner exhaust gas from the exhaust duct falls down toward the kiln inlet part side to be picked out from the gas extracting pipe of the chlorine bypass apparatus becomes high and the flow of the above-mentioned calciner exhaust gas prevents the flow of the kiln exhaust gas from the kiln inlet part side of the cement kiln to bring about pressure loss on the relevant exhaust gas flow and that, when not reaching 20°, there is a risk of dusts of the raw material in the calciner exhaust gas depositing on the relevant baffle wall to cause the operation to be deficiently affected.

Moreover, the spacing between the lower end edge of the baffle wall and the opposite wall plane of the pipe inclination part is configured such that the average flow rate of exhaust gas between the both falls within the range of 15 to 35 m/s. This is because there is a risk that, when the above-mentioned average flow rate of the exhaust gas does not reach 15 m/s, the calciner exhaust gas whose flow becomes predominant falls down toward the kiln inlet part side, and conversely, when the above-mentioned spacing is configured so as to exceed 35 m/s, the relevant spacing becomes too narrow, causing the pressure loss in the pipe inclination part to become increased and causing the operation to be deficiently affected in a similar manner as described above.

DESCRIPTION OF EMBODIMENTS

Figure 1:
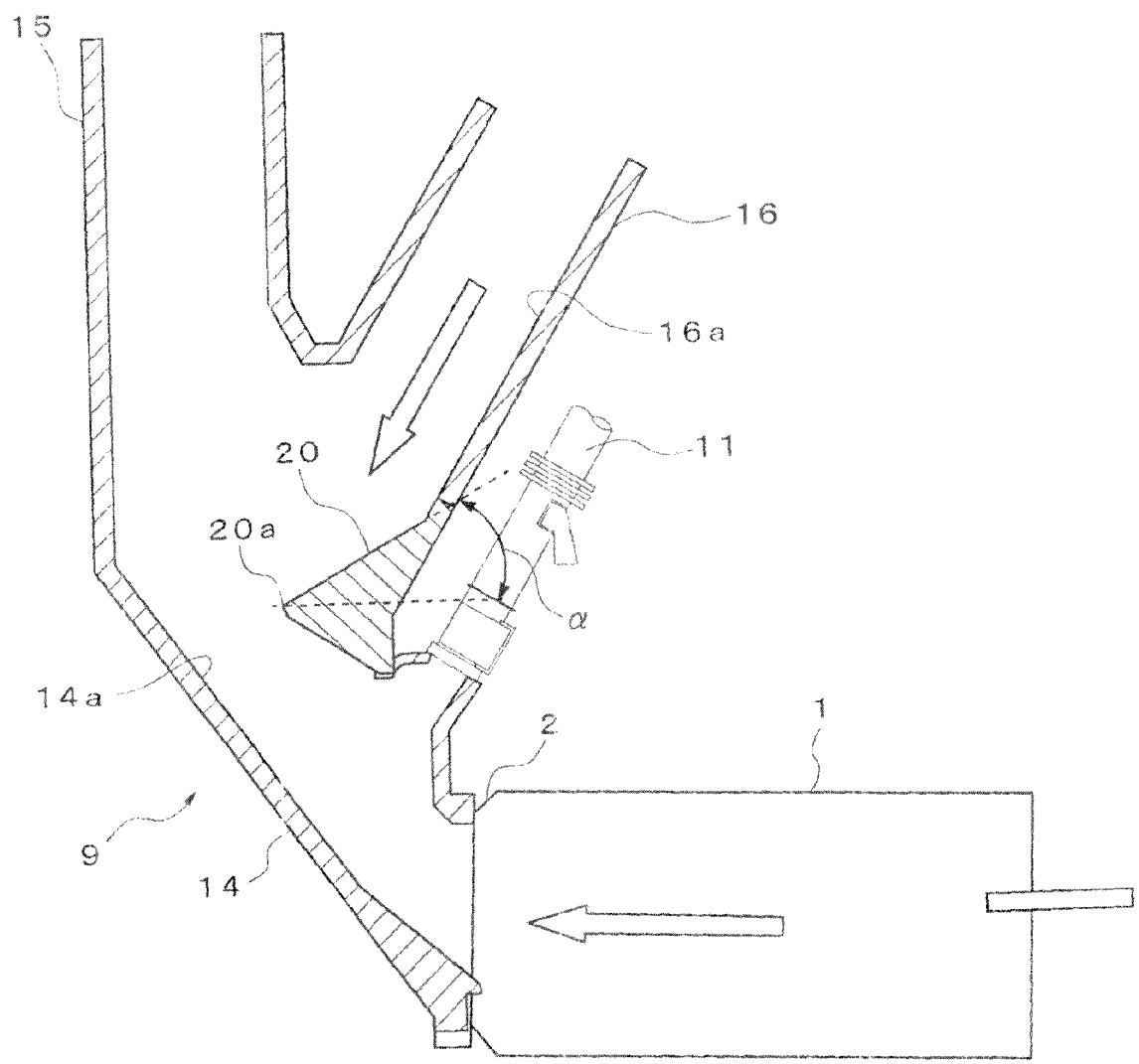
FIG. 1 is a vertical cross-sectional view of the essential portion showing one embodiment according to the present invention.
Figure 4:
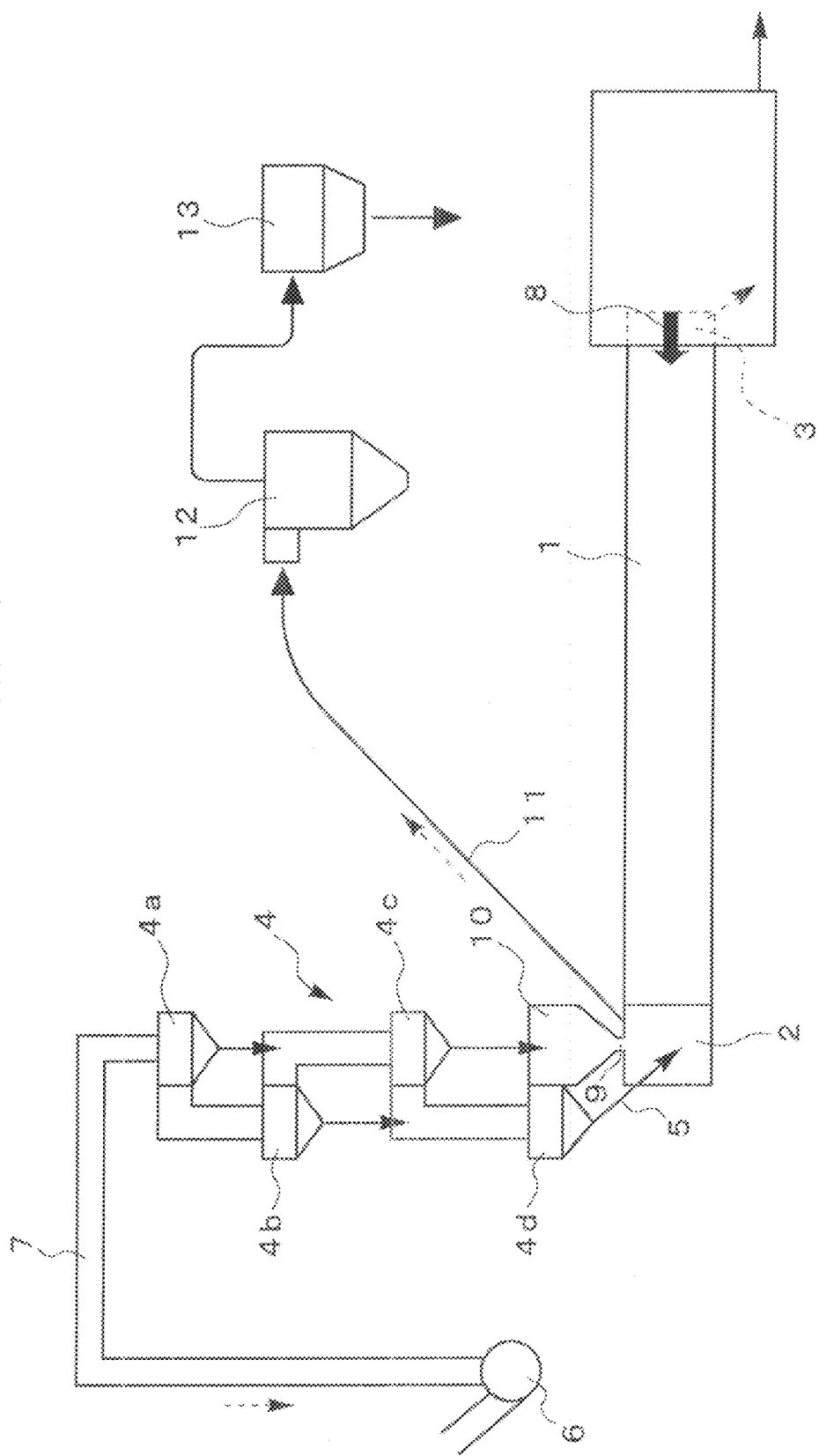
FIG. 4 is a schematic configuration diagram showing a general cement plant.
Figure 5:
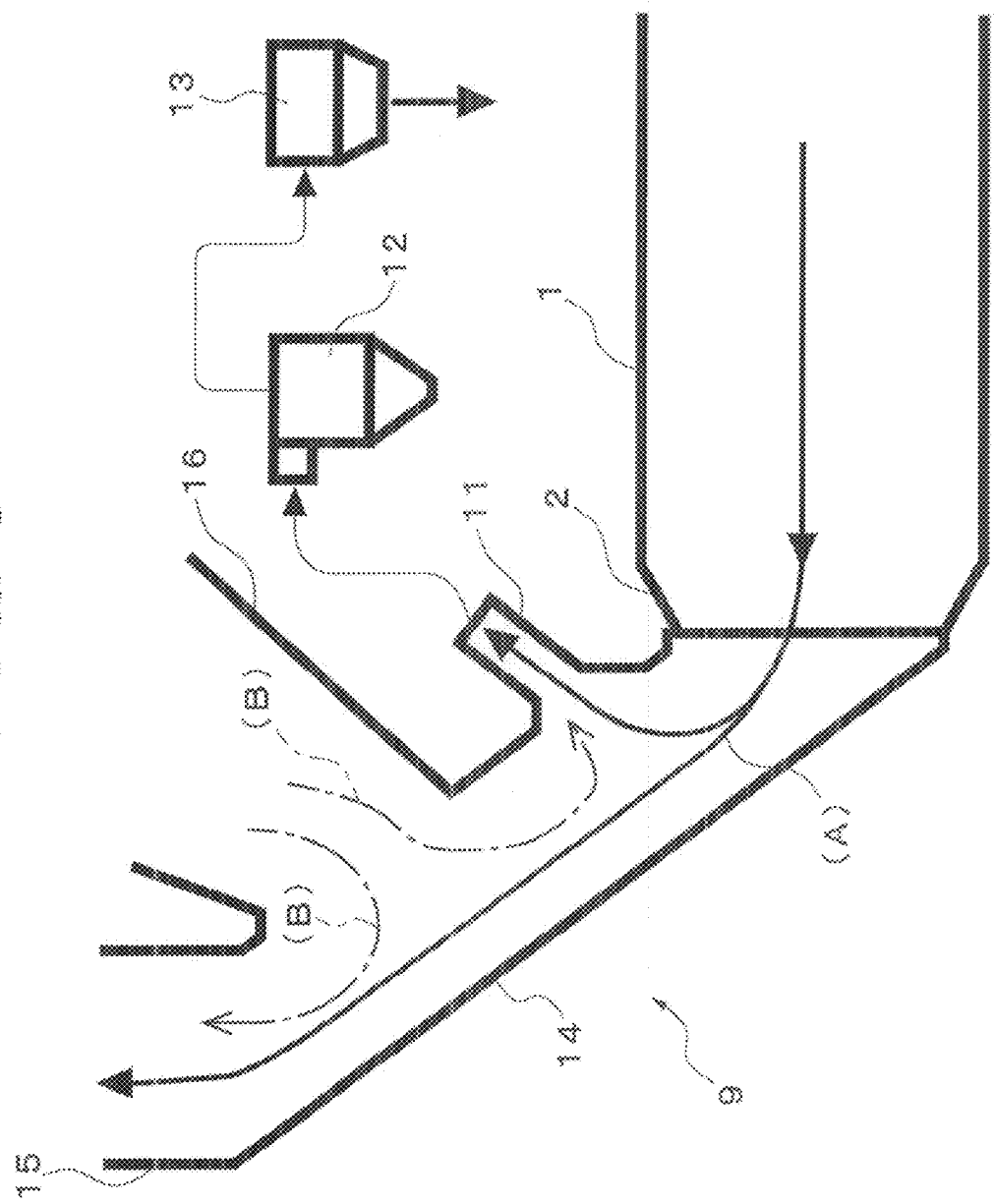
FIG. 5 is an enlarged view showing the essential portion of FIG. 4 along with a flow of exhaust gas.

FIG. 1 shows the essential portion of one embodiment of a cement plant according to the present invention. The other constituent portions are similar to those shown in FIG. 4 and, hereafter, their description is simplified using the same reference signs for those.

As shown in FIG. 1, in this cement plant, in a lower part of a lower face 16a of the exhaust duct 16 for the calciner 10 (joint part with the pipe inclination part 14), a baffle wall 20 is formed such that its inclination angle with respect to the horizontal plane is gentler than that of the relevant lower face 16a. The baffle wall 20 is a flat plane with an inclination angle within a range of α=20 to 60° with respect to the horizontal plane, and is formed so as to protrude toward the pipe inclination part 14 side.

Furthermore, a spacing between a lower end edge 20a of the baffle wall 20 and an opposite wall plane 14a as the inner wall of the downside face of the pipe inclination part 14 is configured such that an average flow rate of the exhaust gas passing through between the lower end edge 20a and the opposite wall plane 14a falls within a range of 15 to 35 m/s.

EXAMPLES

The inventors analyzed the change in pressure loss and the like in the exhaust gas flow from the cement kiln 1 to the pipe inclination part 14 regarding Examples 1 to 11 and Comparative Examples 1 to 6 in the case that the inclination angle of the baffle wall 20 shown in FIG. 1 and the average flow rate of the exhaust gas passing through between the lower end edge 20a thereof and the opposite wall plane 14a of the pipe inclination part 14 were changed.

TABLE 1

| | Average Gas Rate across Closest Cross-Sectional Plane (m/s) | Inclination Angle (°) | Closest Distance (mm) | Pressure Loss between Kiln and Rising Duct (mmAg) |
|---|---|---|---|---|
| Example 1 | 16.7 | 30 | 2343 | 21.54 |
| Example 2 | 15.2 | 20 | 2832 | 19.64 |
| Example 3 | 15.5 | 30 | 2343 | 21.87 |
| Example 4 | 34.2 | 20 | 1200 | 26.23 |
| Example 5 | 24.8 | 45 | 1800 | 25.28 |
| Example 6 | 28.1 | 50 | 1500 | 25.56 |
| Example 7 | 21.5 | 35 | 1992 | 24.21 |
| Example 8 | 17.1 | 60 | 2350 | 21.76 |
| Example 9 | 24.9 | 20 | 2380 | 20.44 |
| Example 10 | 33.8 | 25 | 2340 | 28.28 |
| Example 11 | 25.4 | 40 | 2413 | 21.08 |
| Comparative Example 1 | 40.8 | 30 | 1000 | 41.73 |
| Comparative Example 2 | 37.0 | 35 | 1100 | 36.51 |
| Comparative Example 3 | 34.9 | 70 | 1400 | 39.30 |
| Comparative Example 4 | 15.9 | 70 | 2785 | 33.67 |
| Comparative Example 5 | 25.3 | 70 | 2207 | 40.01 |
| Comparative Example 6 | 34.9 | 70 | 2170 | 41.96 |

Table 1 is a chart showing the analysis results in the case that the inclination angle and the average flow rate of the exhaust gas were changed in Examples mentioned above and presents the dimensions and results.

Figure 3:
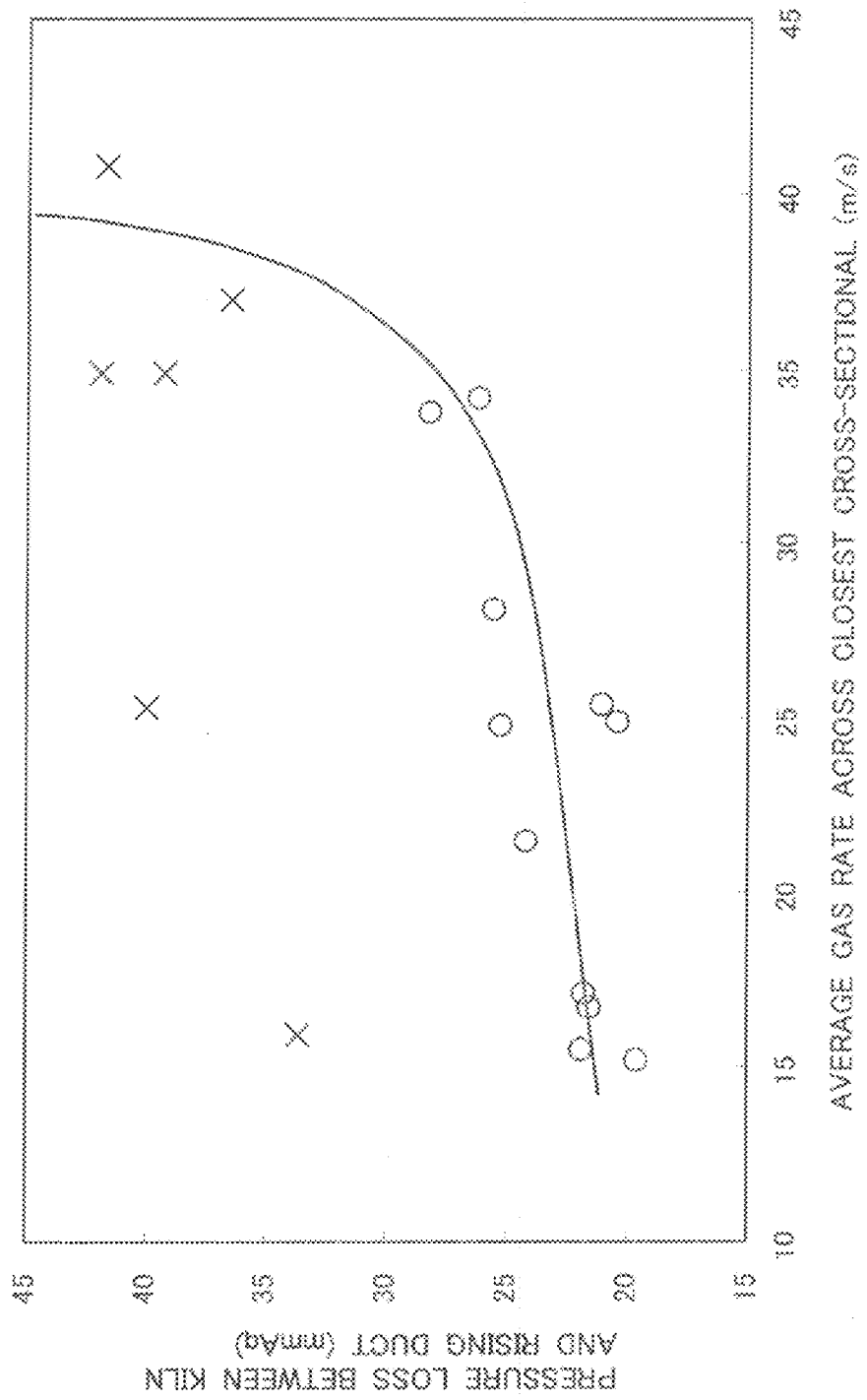
FIG. 3 is a graph obtained by plotting the results in Table 1.

FIG. 3 showing the above-mentioned results as a plot in which the average flow rates (m/s) of the exhaust gas passing through between the lower end edge 20a and the opposite plane 14a of the pipe inclination part 14 are on the horizontal axis and the pressure losses (mmAq) in the exhaust gas flow from the cement kiln 1 to the pipe inclination part 14 are on the vertical axis.

Figure 2:
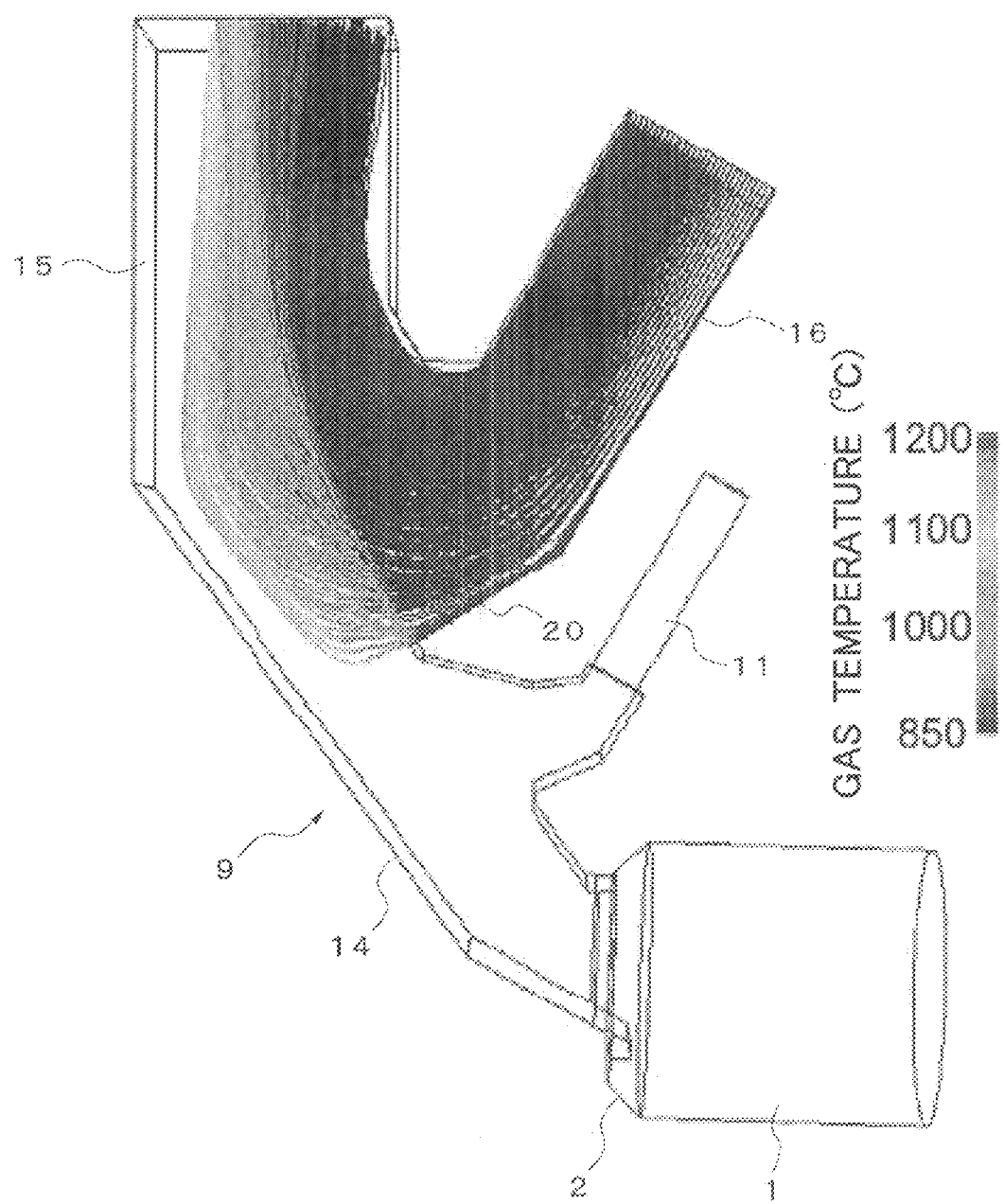
FIG. 2 is a diagram showing flow lines of exhaust gas as analysis results in Examples under usage of the embodiment in FIG. 1.
Figure 6:
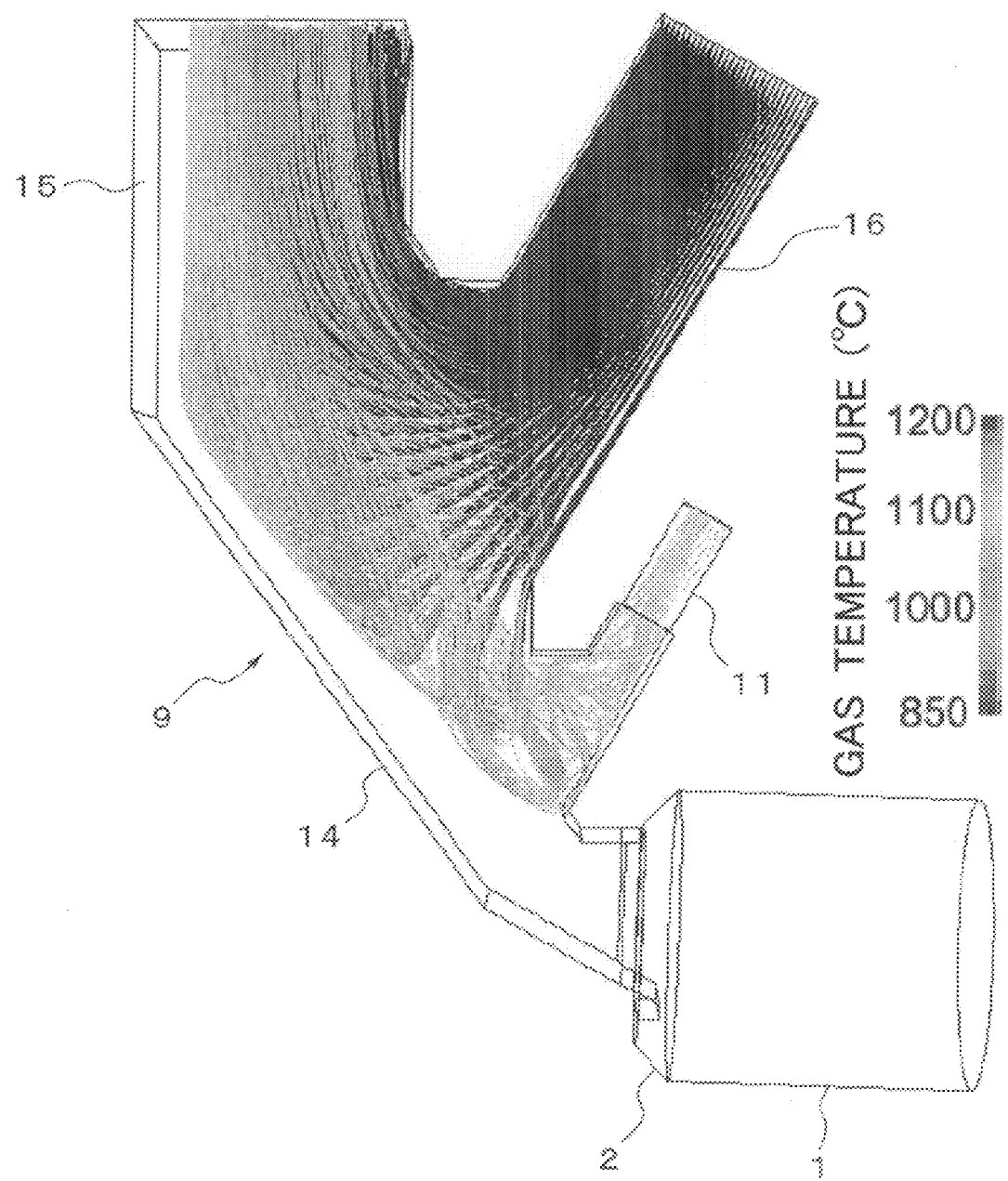
FIG. 6 is a diagram showing flow lines of exhaust gas as analysis results in Examples mentioned above under usage of the conventional cement plant.

Furthermore, the flows of the calciner exhaust gas discharged from the exhaust duct 16 were analyzed regarding the cement plant shown in FIG. 2 and the conventional cement plant shown in FIG. 6.

From the analysis results shown in Table 1, FIG. 2, FIG. 3 and FIG. 6 as above, in Examples 1 to 11, it is apparent that the flow of the exhaust gas does not suffer large pressure loss, and in addition, the calciner exhaust gas from the exhaust duct 16 is prevented from falling down toward the kiln inlet part 2 side of the cement kiln 1 and being picked out from the gas extracting pipe 11, and thus that the exhaust gas from the cement kiln 1 which gas is high in chlorine concentration can exclusively be sent to the chlorine bypass apparatus from the gas extracting pipe 11, this enabling the chlorine concentration in the cement kiln 1 to be efficiently reduced due to the exhaust gas extraction by a small amount, as a consequence of configurations in which the inclination angle of the above-mentioned baffle wall 20 with respect to the horizontal plane falls within a range of 20 to 60° and the spacing between the lower end edge 20a of the baffle wall 20 and the opposite wall plane 14a of the pipe inclination part 14 is set such that the average flow rate of the exhaust gas therebetween falls within a range of 15 to 35 m/s.

On the contrary, when the above-mentioned average flow rate of the exhaust gas exceeds 35 m/s as in Comparative Examples 1 and 2, it is apparent that the above-mentioned pressure loss drastically elevates and that the spacing between the above-mentioned lower end edge 20a and opposite wall plane 14a is too narrow, this causing the pressure loss in the pipe inclination part 14 to increase and causing the risk of the operation to be affected.

Moreover, when the above-mentioned inclination angle exceeds 60° even in case that the above-mentioned average flow rate of the exhaust gas falls within the range of 15 to 35 m/s as in Comparative Examples 3 to 6, it is apparent that the flow of the calciner exhaust gas disturbs the flow of the kiln exhaust gas from the pipe inclination part 14 toward the rising duct 15, this similarly causing the pressure loss in the pipe inclination part 14 to become increased.

Incidentally, in above-mentioned embodiment, only the case that the gas extracting pipe 11 of the chlorine bypass apparatus is connected to the upside face of the pipe inclination part 14 is described, whereas the present invention is not limited to this but can be similarly applied to a case where the gas extracting pipe of the chlorine bypass apparatus is connected to a side face between the above-mentioned upside face and a downside face of the pipe inclination part 14.

INDUSTRIAL APPLICABILITY

By preventing calciner exhaust gas low in chlorine concentration from contamination and extracting a part of kiln exhaust gas high in chlorine concentration, there can be provided a cement plant including a chlorine bypass apparatus capable of efficiently reducing the chlorine concentration in a cement kiln due to exhaust gas extraction by a small amount.

REFERENCE SIGNS LIST

1 Cement kiln
2 Kiln inlet part
4 Preheater
9 Exhaust gas pipe
10 Calciner
11 Gas extracting pipe of chlorine bypass apparatus
12 Cyclone of the same
13 Bag filter of the same
14 Pipe inclination part
14*a* Opposite wall plane
15 Rising duct
16 Exhaust duct from calciner
16*a* Lower face
20 Baffle wall
20*a* Lower end edge
$\alpha$ Inclination angle of baffle wall 20

The invention claimed is:

1. A cement plant comprising:
 a calciner which calcines the cement raw material preheated by a preheater;
 a cement kiln which burns the cement raw material calcined by the calciner;
 an exhaust gas pipe which feeds exhaust gas discharged from a kiln inlet part of the cement kiln to the preheater; and
 a chlorine bypass apparatus which is connected to the exhaust gas pipe and picks out a part of the exhaust gas,
 wherein the exhaust gas pipe comprises:
  a pipe inclination part which gradually inclines upward toward a downstream side of the exhaust gas from the kiln inlet part; and
  a rising duct which is connected to an upper end part of the pipe inclination part and introduces the exhaust gas to the preheater,
 wherein an exhaust duct of the calciner is connected to an upside face of the pipe inclination part, and a gas extracting pipe of the chlorine bypass apparatus is connected to the pipe inclination part between the exhaust duct and the kiln inlet part,
 wherein a baffle wall protruding toward the pipe inclination part side on a lower face of the exhaust duct of the calciner at an inclination angle within a range of 20 to 60° with respect to a horizontal plane is formed, and a spacing between a lower end edge of the baffle wall and an opposite wall plane of the pipe inclination part is configured such that an average flow rate of the exhaust gas between the lower end edge and an opposite wall plane falls within a range of 15 to 35 m/s, and
 wherein both the inclination angle of the baffle wall and the average flow rate of the exhaust gas prevent gas passing through the exhaust duct of the calciner from entering the chlorine bypass apparatus.

2. The cement plant of claim 1, wherein the gas extracting pipe is connected to the upside face of the pipe inclination part.

3. The cement plant of claim 1, wherein the gas extracting pipe is connected to a side face between and the upside face of the pipe inclination part and a downside face of the pipe inclination part.

* * * * *